J. B. BOONE.

LUBRICANT PACKING FOR AXLE-BOXES.

No. 7,217. Reissued July 11, 1876.

WITNESSES:

Jas. F. Duhamel.

M. J. Sullivan.

INVENTOR

James B. Boone.

PER

H. S. Abbot

ATTORNEY.

N. PETERS, PHOTO-LITHOGRAPHER, WASHINGTON, D. C.

UNITED STATES PATENT OFFICE.

JAMES B. BOONE, OF ATCHISON, KANSAS.

IMPROVEMENT IN LUBRICANT PACKINGS FOR AXLE-BOXES.

Specification forming part of Letters Patent No. 175,018, dated March 21, 1876; reissue No. 7,217, dated July 11, 1876; application filed June 5, 1876.

*To all whom it may concern:*

Be it known that I, JAMES B. BOONE, of Atchison, in the county of Atchison and State Kansas, have invented certain new and useful Improvements in Lubricant Packing for Axle-Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of this invention is to provide a convenient, cheap, and efficient packing for the axle-boxes of railroad-car axles, or for such other axles or shaft-journals as necessarily revolve at high speeds. The said invention, therefore, consists of fibrous material cut to convenient lengths, and made up in bundles of convenient size for packing into the boxes surrounding the axles. The fibers are so bundled that they shall stand on end in the bundles, thus exposing their ends, and the bundle or bundles can be bent around, or partially around, the axles, presenting their cut ends to the surface of the axles.

I may use any suitable material for this purpose; but I prefer to use Manila grass or Sisal grass.

By this arrangement of bundle and fiber only a small quantity of lubricating material is required in the axle-box; and the said material, whether of the consistency of oil or tallow, will be readily and regularly fed through the fibers by capillary action, thus excluding all gritty matter from the axle, and keeping it more regularly and efficiently lubricated than can be the case by the use of rags and irregularly-packed long fibers or ropes of cotton, woolen, and other material commonly employed for such purpose.

The accompanying drawing, forming part of this specification, shows the method of bundling the fibers.

Figure 1:
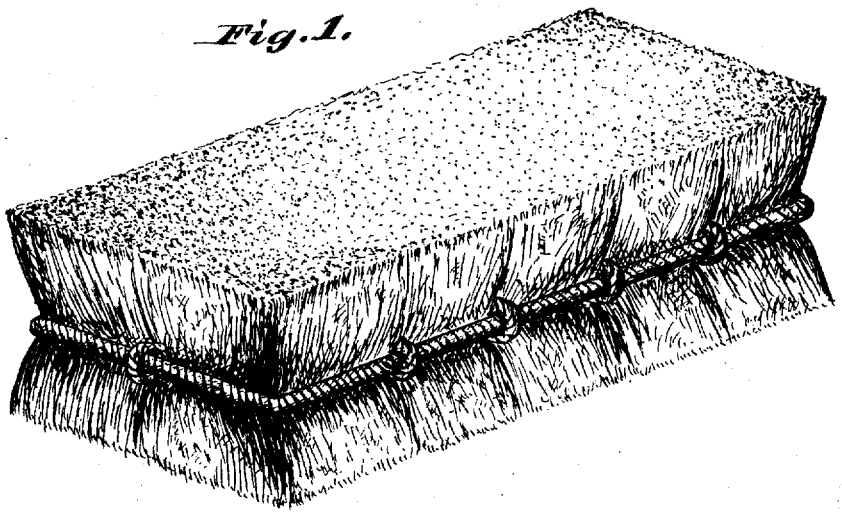
Figure 2:
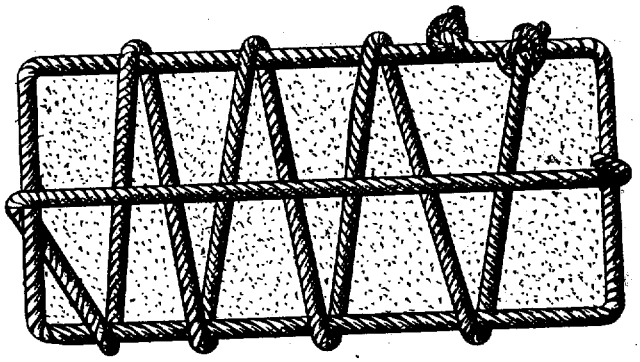

Figure 1 is a perspective view of a bundle, showing the cords with which it is bound; and Fig. 2 is a plan or section, showing the crossing of the cords, binding the fibers into a compact bundle.

These bundles form an ever-ready and convenient portable article for the purpose intended, a supply of which can always be kept in store, ready for immediate use.

Having thus fully described this lubricant packing as of my invention, I claim—

As an article of manufacture, fiber bundled in packages, having the ends of the fibers exposed, the said packages or bundles, forming a lubricant packing for axle-boxes, substantially as hereinbefore set forth.

In testimony that I claim the foregoing I have hereunto set my hand this 24th day of May, 1876.

JAMES B. BOONE.

Witnesses:

GILES E. SCOVILLE,

J. W. WAGGENER.